United States Patent
Chen et al.

(10) Patent No.: US 7,732,547 B2
(45) Date of Patent: Jun. 8, 2010

(54) FLUORINATED CYCLIC OLEFINIC GRAFT POLYMER

(75) Inventors: Jen-Luan Chen, Taipei (TW); Dar-Ming Chiang, Hsinchu (TW); Wen-Liang Liu, Hsinchu (TW)

(73) Assignee: Industrial Technology Research Institute (TW)

( * ) Notice: Subject to any disclaimer, the term of this patent is extended or adjusted under 35 U.S.C. 154(b) by 225 days.

(21) Appl. No.: 11/776,554

(22) Filed: Jul. 12, 2007

(65) Prior Publication Data

US 2009/0018269 A1    Jan. 15, 2009

(51) Int. Cl.
    *C08F 36/16*    (2006.01)
(52) U.S. Cl. .......................... 526/280; 525/72; 525/240; 526/281
(58) Field of Classification Search ................. 526/280, 526/281; 525/72, 240
    See application file for complete search history.

(56) References Cited

U.S. PATENT DOCUMENTS

2009/0069521 A1*  3/2009  Nagai et al. .................. 526/243

FOREIGN PATENT DOCUMENTS

| CN | 1096519 | 12/1994 |
| CN | 1856522 | 11/2006 |
| WO | WO 2004/074933 | * 9/2004 |

OTHER PUBLICATIONS

Chemical World, Organic Material, Organic Material Study (6)-fluorine-containing polymer II, p. 314, 1984.

* cited by examiner

*Primary Examiner*—Robert D. Harlan
(74) *Attorney, Agent, or Firm*—Lowe Hauptman Ham & Berner, LLP

(57) ABSTRACT

The present invention provides a graft polymer and compositions comprising a cyclic olefin polymer characterized by having a glass transition temperature of about 60° C. to 250° C. and a molecular weight of about 400 to 300000, and a fluorocarbon alkyl group grafted on the cyclic olefin polymer.

15 Claims, 2 Drawing Sheets

FLUORINATED CYCLIC OLEFINIC GRAFT POLYMER

BACKGROUND OF THE INVENTION

The present invention relates to a graft polymer, more particularly to a fluorinated cyclic olefinic graft polymer.

Organic polymers have been known for their commercial application in making dielectric materials such as electrets. Typically, the organic polymers are made into electrets by charge injection. Unfortunately, the electrets prepared by charge injection may result in a surface charge that is vulnerable to degradation by dust and humidity. Charge injection via electron beam has been suggested to alleviate this problem because it implants the charge below the surface. Thus, the environmental degradation was somewhat reduced.

Conventional electrets could also be made from a combination of olefinic compounds and polymeric compounds. Japanese Laid Open Publication No. 08-041260 disclosed a composition which contains a cyclic olefinic resin and a modified polymeric compound prepared by graft polymerization of at least one modifying monomer selected from an unsaturated carboxylic acid and its derivative with a polymeric compound. U.S. Pat. No 6,107,422 to Wang et al. disclosed a copolymer of an olefin and an unsaturated partially fluorinated functionalized monomer. However, the fluorinated electret materials currently available have limited applicability and performance due to high production costs, low charge retention, and low structural strength. And it is also difficult to process currently available fluorinated electret material by injection molding.

BRIEF SUMMARY OF THE INVENTION

The present invention provides a graft polymer, wherein said graft polymer comprises a cyclic olefin polymer characterized by having a glass transition temperature of about 60° C. to 250° C. and a molecular weight of about 400 to 300000, and a fluorocarbon alkyl group grafted on the cyclic olefin polymer.

Another embodiment of the invention provides a composition which comprises about 10% to about 99.5% by weight of a thermoplastic resin, and about 0.0.5% to about 90% by weight of the above graft polymer.

In a further embodiment, the present invention provides a compound having the formula:

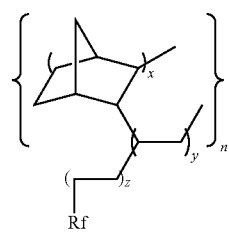

wherein x is 1 to 4, y is 1 to 4, z is 0.1 to 10, n is 200 to 2000; and

Rf is a $C_{1-30}$ fluorocarbon alkyl chain containing at least one fluorine atom.

In yet another embodiment, the present invention provides a compound having the structural formula:

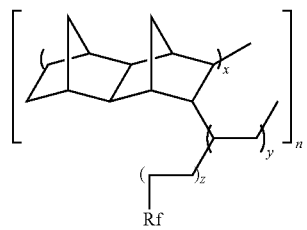

wherein:

x is 1 to 4, y is 1 to 4, z is 0.1 to 10, n is 200 to 2000; and

Rf is a $C_{1-30}$ fluorocarbon alkyl chain.

One other embodiment of the invention provides a composition which comprises about 10% to about 99.95% by weight of a thermoplastic resin, and about 0.0.5% to about 90% by weight of at least one of the compounds of the above formulae.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
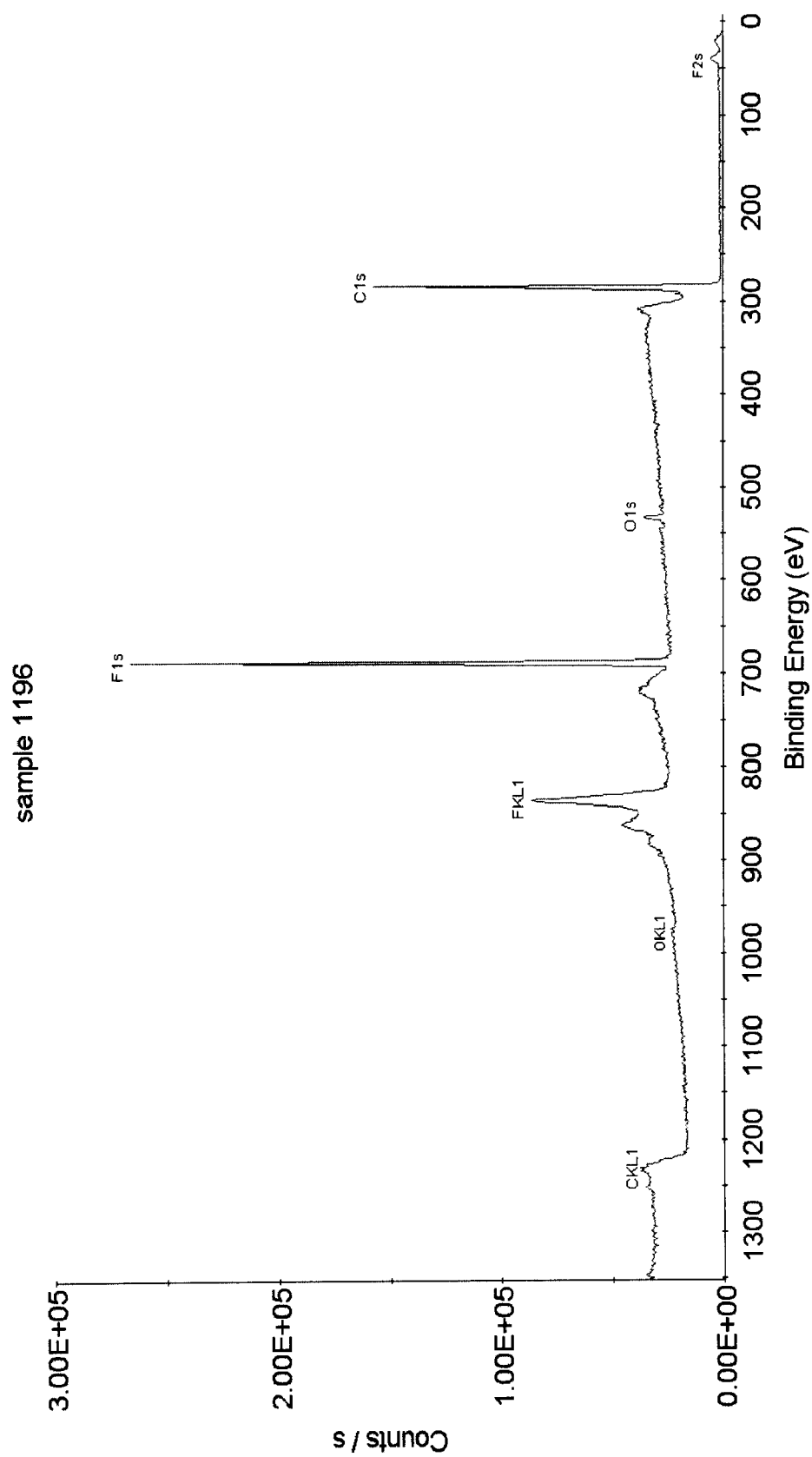
FIG. 1 is the plot of an electron spectroscopy chemical analysis (ESCA) spectrum of the graft polymer according to one example of the invention.

Reference will now be made in detail to the present embodiments of the invention, examples of which are illustrated in the accompanying drawings. Wherever possible, the same reference numbers will be used throughout the drawings to refer to the same or like parts.

The present invention provides a graft polymer comprising a cyclic olefin polymer characterized by having a glass transition temperature of about 60° C. to 250° C. and a molecular weight of about 400 to 300000. A cyclic olefin polymer is grafted with a fluorocarbon alkyl group on a monomer segment of the cyclic olefin polymer, wherein the monomer segment comprises at least one of ethylene, propylene, α-olefin and cyclic olefin monomers.

The cyclic olefin polymer may include cyclic olefin copolymers provided, for example, in the form of block copolymers, alternative copolymers or random copolymers, and are formed by copolymerizing monomers such as ethylene, propylene, $C_{4-16}$ α-olefins or a combination thereof with cyclic olefin monomers. As examples of the present invention, the cyclic olefin monomers may include, but are not limited to, bicycloheptene, tricyclcodecaene and tetracyclododecene. The cyclic olefin monomers may also contain additional elements, such as fluorine, chlorine or oxygen atoms, which may attach to the monomers during the polymerization reaction. In addition, the cyclic olefin monomers may also include alkyl groups as optional substituents. In other examples, there may be chlorine atoms, oxygen atoms or both on the cyclic olefin polymer and fluorocarbon alkyl group.

In one embodiment, prior to the grafting process, the cyclic olefin polymer may be activated. The methods for activating the cyclic olefin polymer may include, but are not limited to, activation by UV irradiation, corona discharge, electron beam, plasma, metallocene, or any combination thereof. After the cyclic olefin polymer is activated, the fluorocarbon alkyl groups may be added generally as unsaturated monomers to form a side chain on the cyclic olefin polymer. However, the invention is not limited to the fluorocarbon alkyl groups described herein. Other partially fluorinated or perfluoroalkyl groups and their derivatives may also be included as the unsaturated monomers to form the side chain of the graft polymer. In another example of the present invention, the unsaturated monomer may be homopolymerized before grafting on the monomer segment of the cyclic olefin polymer. The fluorocarbon alkyl groups may include an acyclic or cyclic alkyl chains having the formula:

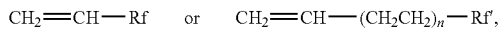

wherein n is 1 or 2, Rf and Rf' both comprise $C_{1-30}$ fluorocarbon alkyl chains.

Another embodiment of the present invention provides a compound having the structural formula:

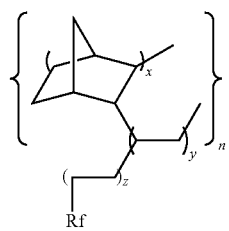

wherein:

x is an integer from 1 to 4, y is an integer from 1 to 4, z is an integer from 0.1 to 10, n is an integer from 200 to 2000; and Rf is a $C_{1-30}$ fluorocarbon alkyl chain containing at least one fluorine atom.

In accordance with one example of the invention, the fluorocarbon alkyl groups may include an acyclic or cyclic alkyl chains having the formula:

wherein n is 1 or 2, Rf and Rf' include $C_{1-30}$ fluorocarbon alkyl chains.

Another embodiment of the present invention provides a compound having the structural formula:

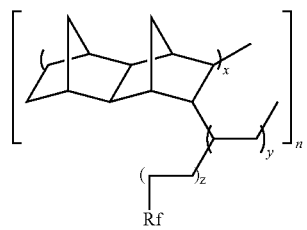

wherein:

x is an integer from 1 to 4, y is an integer from 1 to 4, z is an integer from 0.1 to 10, n is an integer from 200 to 2000; and Rf is a $C_{1-30}$ fluorocarbon alkyl chain.

The graft polymer of the present invention is not limited to those compounds of the above formulae. Other fluorinated cyclic olefin polymers, copolymers or their derivatives with similar structures may also be encompassed within the scope of the invention.

A number of conventional techniques may be adopted to determine the characteristics of the graft polymer. For example, the graft polymer may be dissolved in a solvent such as decalin at about 25° C. to determine its intrinsic viscosity, which in one example of the present invention, is about 0.2 to 60 dl/g. The graft polymer also has a molecular weight of about 300 to 300000 as measured by conventional gel permeation chromatography (GPC). In one example of the present invention, the fluorine content of the graft polymer is found to be about 0.5 to 60% by weight. The graft polymer has a glass transition temperature (Tg) of about 60 to about 150° C. The graft polymer has a melting point of about 90° C. to about 250° C. And in certain examples of the invention, the side chain of the graft polymer may be 0.1 to 150% by weight of the main chain of the graft polymer.

In general, the graft polymers or similar compounds described herein may be blended with thermoplastic resins. Suitable thermoplastic resins that may be blended with the graft polymers described herein include, but are not limited to, polyethylene (PE), polypropylene (PP), polyolefin, polyester, polyacrylate, polystyrene, cyclic olefin copolymer, thermoplastic elastomer, and copolymers, derivatives and combinations thereof. Therefore, additional examples of the present invention includes compositions comprising about 10% to about 99.95% by weight of a thermoplastic resin, and about 0.0.5% to about 90% by weight of the graft polymer or similar compound described above.

In one embodiment of the present invention, the graft polymer that is formed by grafting the fluorocarbon alkyl group on the cyclic olefin polymer has a larger free volume size as compared to the conventional polymers having a free volume size of about 0.5 nm. For example, the graft polymer of the invention may have a free volume size of about 1 nm. As a result, the polymer electret made of such a graft polymer has a high charge density and a low charge decay rate. Also, the graft polymer of the present invention may have a uniform micro-porous structure and a low dielectric constant. Accordingly, a more compact electret structure including the graft polymer of the present invention may be made. In one example, the polymer electret made from a graft polymer of the present invention may have a thickness of about 1 to 10 µm.

An electret made of the graft polymer, copolymer or composition thereof of the present invention may be applicable to manufacture of a variety of devices. For example, the electret may be included as part of the filters, such as virus filters and aerosol filters. For acoustic applications, the electret may be incorporated into electret condensers, silicon electret condensers, loudspeakers (audio beam), ultrasonic applications, hydrophones and headphones. The electret may also be applicable in manufacturing electronic devices, such as saw filters, electret relays, electro-optic switches and transducers. Industrial applications of the electret also includes electret motors, solar cells, air filters and dosimeters. In addition, the electret may be applicable to Electrophotography. For example, the electret may be included in xerography devices and electrostatic recorders.

The invention will now be described in further detail with reference to the following specific, non-limiting examples.

EXAMPLE 1

Preparation of Graft Copolymer

Twenty grams of the commercially available cyclic olefin polymer, Topas 8007 (volume melting index of 30 ml /10 min) was dissolved in toluene in a 100 ml glass flask. The flask was vacuumed using an oil pump under a reduced pressure. Nitrogen gas was then introduced into the flask and the flask vacuumed again for at least three times before the flask was sealed. The flask was irradiated with Cobalt-60 (Co-60) at an irradiation dosage of 25 kGy. To the irradiated polymer was added triisobutylaluminum (10 mmole), 100 ml of heptane and organozirconium dichloride (100 µmole) in a 3 liter stainless steel autoclave under the nitrogen gas atmosphere. The mixture was heated by mechanical stirring to about 60° C. after the autoclave was closed, followed by injecting 8 grams of 1H, 1H, 1H-perfluoro-1-hexene which served as unsaturated monomers into the mixture to initiate a polymerization reaction. The polymerization reaction took place at 60° C. for 3 hours. The polymerized mixture was filtered and washed with heptane several times before the polymerized mixture was dried under 30 mmHg for about 5 hours to yield about 27 grams of the graft polymer product.

The resulting graft polymer yield was 33.3% by weight of the original cyclic olefin polymer. The weight of the graft polymer (W) is calculated by the following formula:

$$W=[(\text{weight of the graft polymer}-\text{weight of the cyclic olefin polymer})/\text{weight of the cyclic olefin polymer}]\times 100\%$$

The graft polymer labeled as sample 1196 had a melting index of about 19 ml/10 min and a fluorine content of about 33.3% by weight estimated from the ESCA spectrum in FIG. 1. Referring to FIG. 1, the fluorine atoms and carbon atoms have binding energies of 700 eV and 300 eV, respectively. And the FT-IR absorbance for fluorocarbon chain of the graft polymer was measured to be about 1245 to 1250 $cm^{-1}$.

EXAMPLE 2

Preparation of Graft Copolymer

Twenty grams of the commercially available cyclic olefin polymer Topas 6015 (volume melting index of 4 ml/10 min) was dissolved in toluene in a 100 ml glass flask. The flask was vacuumed using an oil pump under a reduced pressure. Nitrogen gas was then introduced into the flask and the flask vacuumed again for at least three times before the flask was sealed. The flask was irradiated with Cobalt-60 (Co-60) at an irradiation dosage of 25 kGy. To the irradiated polymer was added triisobutylaluminum (10 mmole), 100 ml of heptane and organozirconium dichloride (100 µmole) in a 3 liter stainless steel autoclave under the nitrogen gas atmosphere. The mixture was heated by mechanical stirring to about 60° C. after the autoclave was closed, followed by injecting 8 grams of 1H, 1H, 1H-perfluoro-1-hexene which served as unsaturated monomers into the mixture to initiate a polymerization reaction. The polymerization reaction took place at 60° C. for about 3 hours. The polymerized mixture was filtered and washed with heptane several times before being dried off under 30 mmHg for about 5 hours to yield about 23 grams of the graft polymer product.

The resulting graft polymer yield was 15% by weight of the original cyclic olefin polymer. The weight of the graft polymer (W) was calculated by the following formula:

$$W=[(\text{weight of the graft polymer}-\text{weight of the cyclic olefin polymer})/\text{weight of the cyclic olefin polymer}]\times 100\%$$

The graft polymer had a melting index of about 11 ml/10 min and a fluorine content of about 14% by weight. And the FT-IR absorbance for fluorocarbon chain of the graft polymer was measured to be about 1248 to 1252 $cm^{-1}$.

EXAMPLE 3

Surface Discharge Test

A thin film made from graft polymer of example 1 was subjected to a surface discharge test. The thin film had a thickness of about 35 pm and an area of about 5×5 $cm^2$. The thin film was charged by corona discharge at a voltage of 14,000 volts for 30 seconds. The charged film was then stored in a PE plastic bag. The film was then removed from the bag using a PE clamp for conducting the surface discharge testing.

Figure 2:
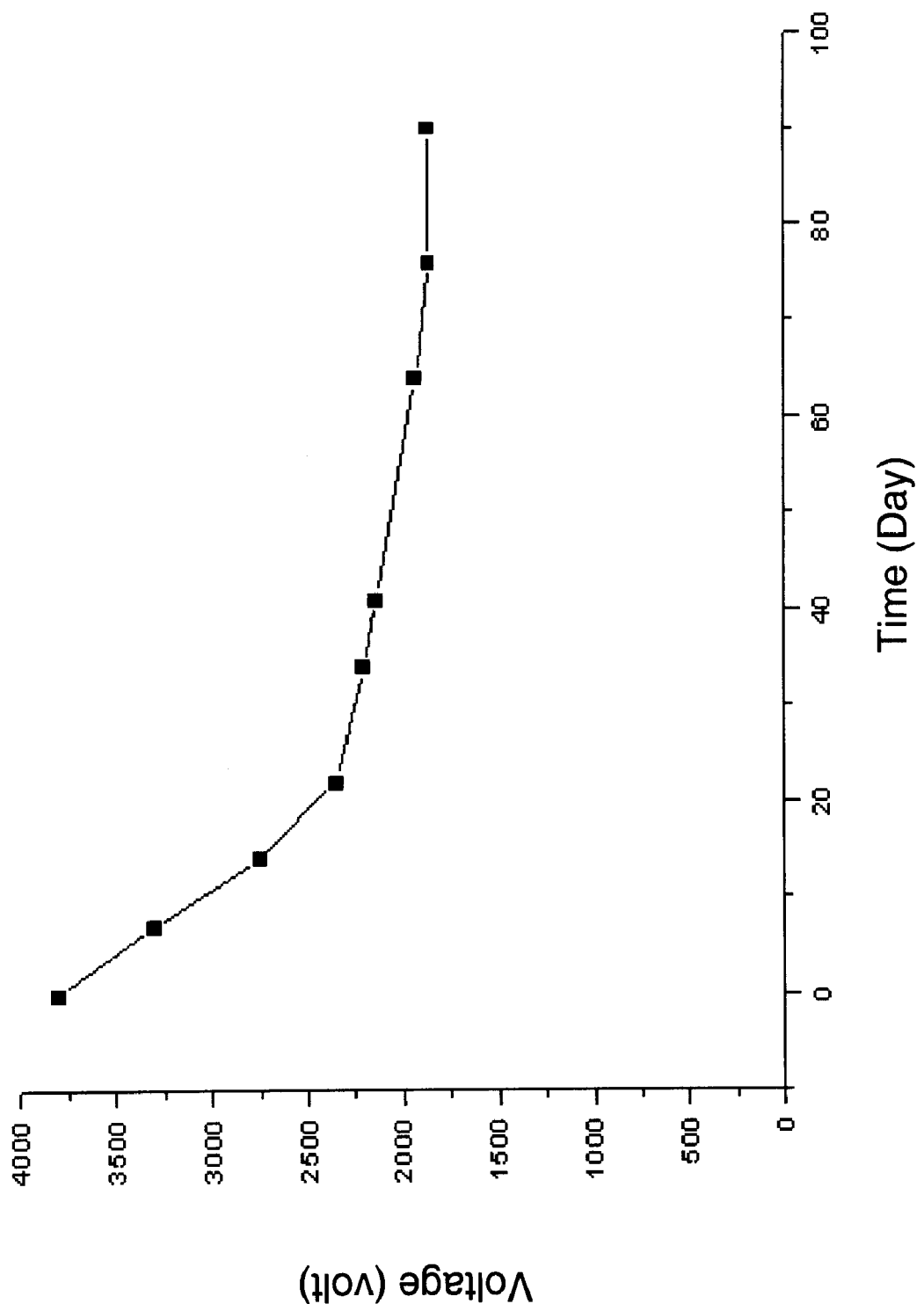
FIG. 2 is a curve illustrating a surface voltage test result for the graft polymer according to another example of the invention.

Referring to FIG. 2, the thin film was measured to possess a voltage of about 3750 volts at the beginning. Over the next few days, the measured voltage of the thin film has quickly decayed by surface discharge as shown by FIG. 2. However, the voltage decay for the thin film came to a stable state with a measured voltage of about 2000 volts after a 20 day period. Therefore, it was evident that the thin film made of a graft polymer of the invention has a small charge decay rate and a high charge density.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A graft polymer comprising a cyclic olefin polymer having the formula:

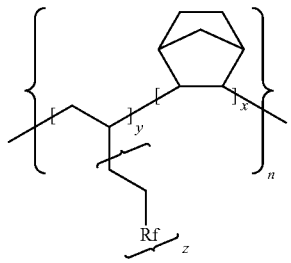

wherein
x is 1 to 4, y is 1 to 4, z is 0.1 to 10, n is 200 to 2000; and Rf is a $C_{1-30}$ fluorocarbon alkyl chain containing at least one fluorine atom, wherein the cyclic olefin polymer is characterized by having a glass transition temperature of about 60° C. to 250° C. and a molecular weight of about 400 to 300000.

2. The graft polymer according to claim 1 further comprising at least one of chlorine and oxygen atoms on the $C_{1-30}$ fluorocarbon alkyl chain.

3. The graft polymer according to claim 1 wherein the $C_{1-30}$ fluorocarbon alkyl chain comprises alkyl chains of the formulae:

$\sim\sim(CH=CH-Rf')$ or $\sim\sim(CH=CH-(CH_2-CH_2)_n-Rf')$ wherein
n is 1 or 2, and Rf' is a $C_{1-12}$ fluorocarbon alkyl chain.

4. The graft polymer according to claim 3, wherein the $C_{1-12}$ fluorocarbon alkyl chains comprise at least one perfluoro alkyl group.

5. A composition comprising:
about 10% to about 100% by weight of a thermoplastic resin; and about 0.05% to about 90% by weight of the graft polymer according to claim 1.

6. A compound having the formula:

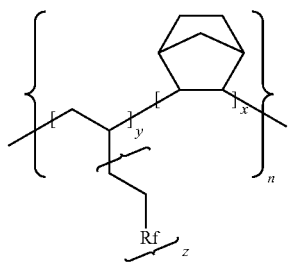

wherein
x is 1 to 4, y is 1 to 4, z is 0.1 to 10, n is 200 to 2000; and Rf is a $C_{1-30}$ fluorocarbon alkyl chain containing at least one fluorine atom.

7. The compound according to claim 6 further comprising at least one of chlorine and oxygen atoms on the $C_{1-30}$ fluorocarbon alkyl chain.

8. The compound according to claim 6 wherein the $C_{1-30}$ fluorocarbon alkyl chain comprises the formulae:

$\sim\sim(CH=CH-Rf')$ or $\sim\sim(CH=CH-(CH_2-CH_2)_n-Rf')$ wherein
n is 1 or 2, and Rf' is a $C_{1-12}$ fluorocarbon alkyl chain.

9. The compound according to claim 8 wherein the $C_{1-12}$ fluorocarbon alkyl chains comprise at least one perfluoro alkyl group.

10. A composition comprising:
about 10% to about 99.5% by weight of a thermoplastic resin; and
about 0.05% to about 90% by weight of the compound according to claim 6.

11. A compound having the formula:

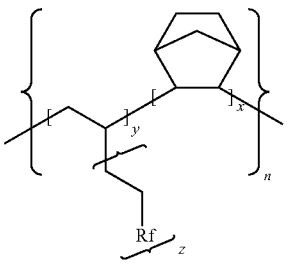

wherein
x is 1 to 4, y is 1 to 4, z is 0.1 to 10, n is 200 to 2000; and Rf is a $C_{1-30}$ fluorocarbon alkyl chain.

12. The compound according to claim 11 further comprising at least one of chlorine and oxygen atoms on the $C_{1-30}$ fluorocarbon alkyl chain.

13. The compound according to claim 11 wherein the $C_{1-30}$ fluorocarbon alkyl chain comprises the formulae:

$\sim\sim(CH=CH-Rf')$ or $\sim\sim(CH=CH-(CH_2-CH_2)_n-Rf')$ wherein
n is 1 or 2, and Rf' is $C_{1-12}$ fluorocarbon alkyl chain.

14. The compound according to claim 13 wherein the $C_{1-12}$ fluorocarbon alkyl chains comprise at least one perfluoro alkyl group.

15. A composition comprising: about 10% to about 99.5% by weight of a thermoplastic resin; and about 0.05% to about 90% by weight of the compound according to claim 11.

* * * * *